United States Patent

Eggleston et al.

[11] Patent Number: 6,101,531
[45] Date of Patent: Aug. 8, 2000

[54] SYSTEM FOR COMMUNICATING USER-SELECTED CRITERIA FILTER PREPARED AT WIRELESS CLIENT TO COMMUNICATION SERVER FOR FILTERING DATA TRANSFERRED FROM HOST TO SAID WIRELESS CLIENT

[75] Inventors: Gene Eggleston, Cary; Mitch Hansen, Fox River Grove, both of Ill.

[73] Assignee: Motorola, Inc., Schaumburg, Ill.

[21] Appl. No.: 09/060,686

[22] Filed: Apr. 15, 1998

Related U.S. Application Data

[63] Continuation of application No. 08/574,537, Dec. 19, 1995, abandoned.

[51] Int. Cl.[7] ............................ G06F 15/16; G06F 15/177
[52] U.S. Cl. ........................ 709/206; 709/207; 709/220; 709/232
[58] Field of Search .................................. 709/206, 207, 709/220, 232, 103, 203; 706/47; 707/3

[56] References Cited

U.S. PATENT DOCUMENTS

| | | |
|---|---|---|
| 5,276,680 | 1/1994 | Messenger . |
| 5,283,856 | 2/1994 | Gross et al. ............................. 706/47 |
| 5,287,456 | 2/1994 | Rhodes et al. . |
| 5,377,354 | 12/1994 | Scannel et al. ......................... 709/103 |
| 5,406,557 | 4/1995 | Baudoin . |
| 5,491,820 | 2/1996 | Belove et al. .............................. 707/3 |
| 5,506,887 | 4/1996 | Emery et al. . |
| 5,513,126 | 4/1996 | Harkins et al. . |
| 5,568,540 | 10/1996 | Greco et al. . |
| 5,621,727 | 4/1997 | Vaudreuil . |
| 5,764,899 | 6/1998 | Eggleston et al. ...................... 709/203 |

*Primary Examiner*—Le Hien Luu
*Attorney, Agent, or Firm*—Romi N. Bose; Terri S. Hughes

[57] ABSTRACT

In a main embodiment, prestage filtering is applied via user-definable filter parameters (e.g., reject, pass, or granularity filters) on data being transferred between a communication unit (201) and communication server (220). For downloading, e.g., email from a host post office (240), a communication server controller (229) preferably either forwards the filter parameters in a query object or message to the post office to apply and return qualified mail (406–414), or the communication server receives all unprocessed mail and applies the filters locally (418–420), only acknowledging as processed that mail which passes the filters. For uploading, e.g., email from a client, a client controller applies an upload prestage filter (432) so as to retain all filter-rejected email, while transmitting email passing the filters (434). Thus, only desired data transfers (i.e., those meeting user defined filters) are communicated over the expense-bearing networks between the remote unit and communication server.

11 Claims, 8 Drawing Sheets

SYSTEM FOR COMMUNICATING USER-SELECTED CRITERIA FILTER PREPARED AT WIRELESS CLIENT TO COMMUNICATION SERVER FOR FILTERING DATA TRANSFERRED FROM HOST TO SAID WIRELESS CLIENT

The present application is a continuation of U.S. application Ser. No. 08/574,537, filed Dec. 19, 1995 now abandoned, entitled "Method and Apparatus for Virtual Session Communications" by Gene Eggleston and Mitch Hansen, commonly owned together with this application by Motorola, Inc.

FIELD OF THE INVENTION

The present invention relates to communications and more particularly an improved method and apparatus for transferring data in a communications system.

BACKGROUND

The last 10 years have seen a tremendous increase in the demand for communications services, including both wired and wireless networks capable of handling data communications. Unlike real-time voice services, such as standard telephony or cellular wireless services, in which circuit-switched communications are used because of the sensitivity of users to the timing of oral dialogue/voice data, greater efficiencies can often be achieved in non-voice data communications through the use of packet-switched or hybrid communications systems. This is particularly the case with communications to remote users (e.g., persons sending messages via one of the well-known available wireless networks like GSM (Global System for Mobiles) or AMPS (Advanced Mobile Phone System) cellular), where protracted circuit-switched sessions into a mail server or LAN (local area network) could be prohibitively expensive due to the high per-minute session charges by the wireless service provider.

One solution to this problem has been for users to limit, as much as feasible, their communications to sessionless communications. This can be done, e.g., by subscribing to additional email services that can receive LAN/WAN (wide area network) email and send out broadcast pages and transmissions to registered users, in lieu of requiring a user to maintain a session with a mail server. However, this disadvantageously requires subscription to an additional service, and is typically limited in the types of applications supported. With the rapid growth in emerging session-oriented applications—like the popular client server application of Lotus Notes®—the need is growing for more cost effective solutions to providing connectivity of such session-oriented applications and users remotely located from their host servers.

Regardless of whether a session-oriented or session-less communication service is used, it is also desirable to limit the amount of information communicated between a remote user and host, both to save off-site user's time and to limit the costs arising from the more expensive rates for remote communications. Unfortunately, typical applications like email do not provide for user-selected methods for choosing and limiting the volume of down-loaded communications, or for filtering uploaded communications. Thus, a user who wants to receive remote messaging is left with an option of receiving all his messages, even the ones he or she might otherwise be willing to leave unread until a later time when no longer using expensive remote communications services.

Further, many processes, like that of a typical email reply, are wasteful of bandwidth by resending all earlier messages each time a new reply is generated, even though the earlier messages may still be stored at both ends of the wireless network.

In addition to the above concerns over how to optimize the types and amount of data being transferred, there is additionally a problem in a lack of effective techniques for monitoring and even controlling an aggregate use of tariffed networks. While the network service providers have means for tracking use by an individual unit basis, which is totaled in periodic billing statements, this information is typically unavailable to users or their managers/application administrators. Thus, users and managers are typically left without any effective means for controlling the level of messaging during a billing cycle, and can only monitor or react to usage following the service providers periodic statements.

There remains therefore a need for an improved means for data communications that solves these and related problems.

DETAILED DESCRIPTION

Figure 1:
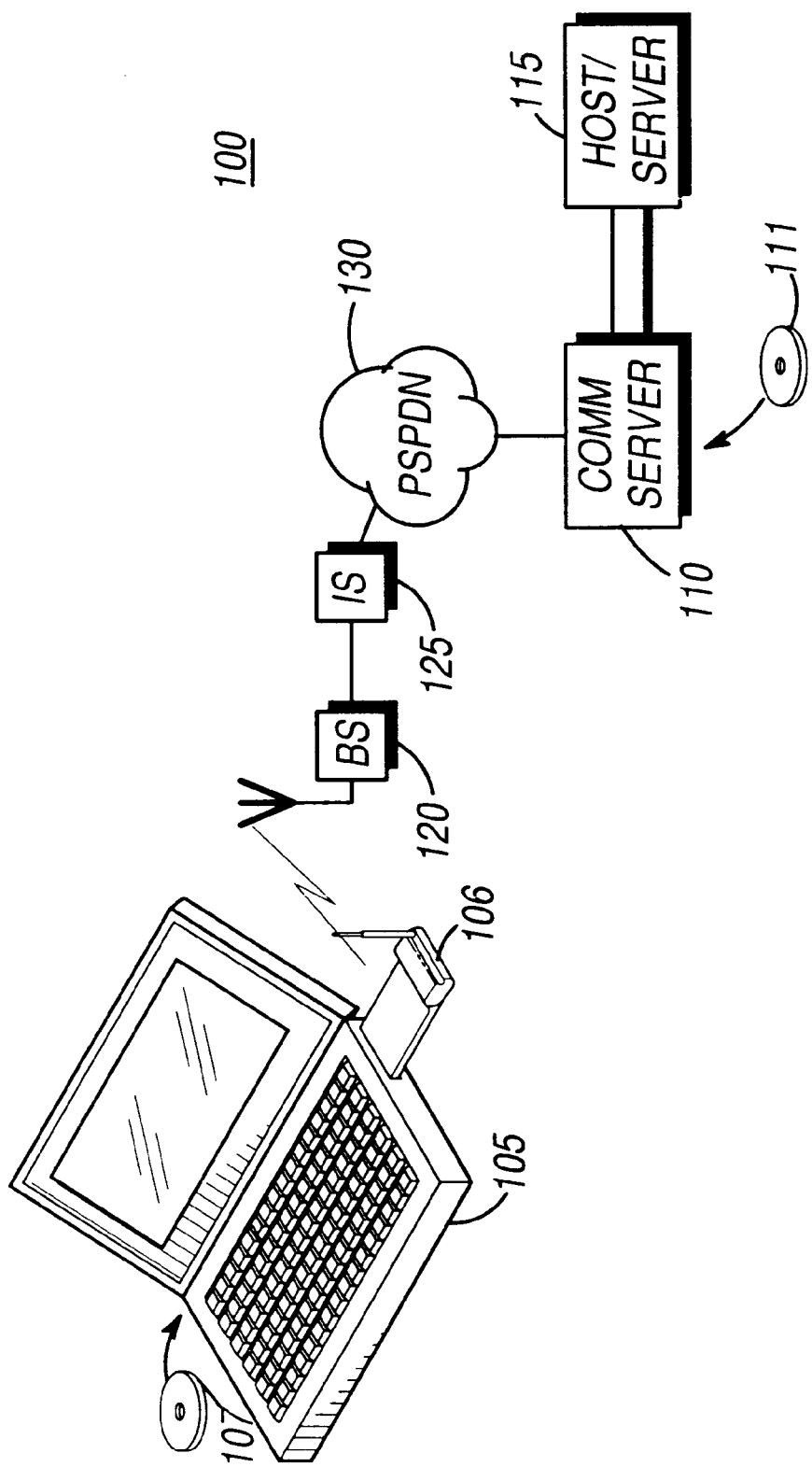
FIG. 1 is a block diagram of a communications system according to a first embodiment of the invention.

These problems and others are solved by the improved method and apparatus according to the invention. A presently preferred first main embodiment of the invention is a system including a virtual session manager (VSM) for establishing and maintaining a sessionless communication path with a first data processing device (e.g., a mobile client) on the one hand and a session-oriented communication path with a second data processing device (e.g., a host system). The session-oriented communication protocol with the host system permits remote access to, e.g., LAN-based applications, while the virtual session, via a sessionless-oriented communication protocol, between the VSM and remote (i.e., coupled via a tariffed network or connection) client permits this access to be carried out without the expense of a dedicated/circuit switched connection.

In a second main embodiment, a prestage filter stage is provided for applying user-definable filter parameters (e.g., reject, pass, or granularity filters) on data being transferred between the remote communication unit and communication server. For downloading, e.g., email from a host post office, a communication server controller preferably either forwards the filter parameters in a query object or message to the post office to apply and return qualified mail, or the communication server receives all unprocessed mail and applies the filters locally, only acknowledging as processed that mail which is qualified. For uploading, e.g., email from a client, a client controller applies an upload prestage filter so as to retain all filter rejected mail, while transmitting mail passing the filters. Thus, only desired data transfers (i.e., those meeting user defined filters) are communicated over the expense-bearing networks between the remote unit and communication server.

In yet another main embodiment, a select and summary (S&S) listing or index is used to provide user flexibility in reviewing and requesting otherwise filtered data. Both the user's remote communication unit and communication server maintain a S&S index containing identifying (summary) information about data which has not been fully transferred between the communication unit and communication server. As new data is reviewed and filtered for transfer, identifying/summary information is captured for any non-qualifying data by either a host unit or the communication server. This information is stored in the communication server's S&S index, and at least periodically transferred via update messaging to the remote communication unit. Upon reviewing its updates or its S&S index, the user may send a request for such of the data that it desires partial or full transfers for further review. Thus, a cost efficient review mechanism is provided to users for determining whether to transfer data that otherwise fails selected filter parameters.

In a fourth main embodiment, a method and apparatus for optimized reply to messaging is provided. When sending a reply, the remote communication unit's controller generates a delta (e.g., data representing the content difference between two messages) between a preceding message and the reply message, and forms an optimized reply using the delta and an identifier of the preceding message. On receiving the optimized reply, the communication server uses the data unit identifier to retrieve the preceding message from a further host (e.g., the post office mailbox of the user associated with the remote unit), reconstructs the full reply from the retrieved message and the delta, and forwards the full reply to the addressee. When receiving a reply for the remote unit, an index is preferably maintained at both the remote unit and communication server of mail stored at the remote unit. Resort is made to this index to determine a preceding message forming part of the reply. An optimized reply is similarly formed from a delta and identifying information of the preceding message, and sent to the remote unit. In this manner, the volume and expense incurred in reply messaging is greatly reduced, by only sending a delta and small header (i.e., the identifying information).

Finally, in a fifth embodiment, a rate governor is provided for monitoring and controlling the amount of communications between the remote unit and communication server. Preferably, as threshold(s) are passed a user is alerted to amounts (time and/or charges) spent or remaining, and once a use limit is reached further communication is restricted. A main rate governor is maintained at the communication server, allowing access, control and the like by system administrators and the like. A further rate governor, responsive to the main rate governor, may also be used at the remote unit. By means of this rate governor a mechanism is provided for both limiting user or group data transfer beyond a set amount, as well as providing alerts to users as the limit is approached.

Turning now to FIG. 1, there is generally depicted a communication system 100 in accordance with a first embodiment of the invention. This system is configured to support one or more user devices such as wireless subscriber units (i.e., mobile station (MS) 105) communicating with host processor 115 via an infrastructure including base station 120 and intermediate system 125 coupled to a data network 130. In the illustrated case mobile station 105 is a portable computer having an rf (radio frequency) modem 106. A communications server 110, including a virtual session manager (VSM) and query manager (QM), is coupled between the public data network 130 and the host server 115. The virtual session manager and query manager are, preferably, an appropriately configured data processing device, the VSM and QM program being shipped for loading on the server 110 via any convenient means such as a machine-readable CD-ROM 111 (compact disc-read only memory) or the like. Counterpart client-communications software, e.g., a prestage filter and rate governor, can be shipped via a similar convenient form like CD-ROM 107, downloaded directly from server 110 to subscriber 105 (also being, e.g., a data processing device, by which is meant virtually any processor (but not a human) capable of processing data for a programmed result, whether a general purpose computer or more specialized electronic processor), or the like.

In this embodiment the mobile user 105 communicates with the server/VSM 110 using any appropriate data protocol being used by the data network 130, as necessarily modified for transport over the wireless infrastructure; the wireless infrastructure could be, e.g., any private system like ARDIS® or DataTAC®, CDPD (cellular digital packet data), GPRS (GSM Packet Radio Service), and the like. Thus, a sessionless data flow between the mobile user 105 and server/VSM 110 occurs on an event driven basis, and no costly connection is maintained when there is nothing being communicated. In order to keep connectivity costs to a minimum, the server 110 is preferably connected to the LAN/WAN on which the host 115 is also connected, via any standard LAN/WAN communication channel (e.g., a bus or backbone). This allows the communications server 110 to advantageously maintain the same session with the host 115 that the client 105 typically enjoys when connected to the LAN/WAN. Thus, by use of the server 110 the client 105 can achieve a virtual session with the host 115 with almost the same access as if directly connected to the host's 115 LAN, but at a substantial reduction in the cost of communicating via the wireless network and PDN 130.

Figure 2:
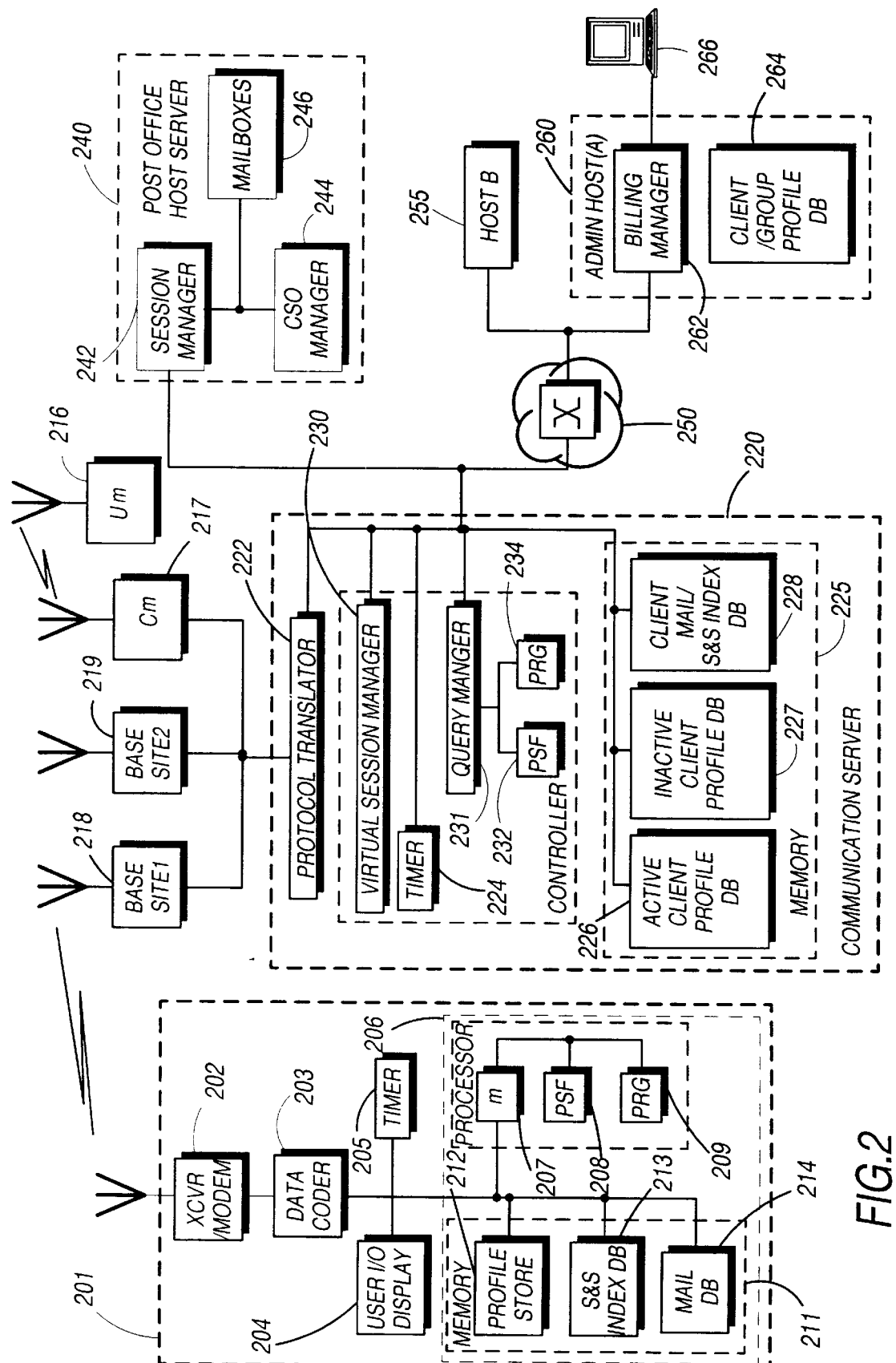
FIG. 2 is a block diagram of a communications system according to a further embodiment of the invention.

FIG. 2 illustrates an alternative communication system 200 embodiment of the present invention. A first client, a mobile end system (M-ES) computer including a user device 201, is in communication with a base station (BS1) 218 of a wireless communication system. This base station 218 is coupled, e.g., on a same bus or via bridges/routers, to a communication server 220 which includes VSM 230. An electronic mail (email) post office is coupled locally to VSM 230, either as another program running on the same communications server 220 or located on another server 240 of the communications server's 220 LAN/WAN. It is not important, however, where the post office is located for purposes of operation of the VSM 230, as is illustrated by other application hosts B and C 255, 260 being in communication via other networks such as a public data network or public switched telephone network 250. In fact, the same user 201 could be concurrently coupled via the VSM 230 to, for example, a local email post office 240, a remote client-server host 255, a further database host server (not shown), an administrator host server 260, a multimedia host, a voice processor, etc. It should be understood that for purposes of this application, a first device or component is responsive to or in communication with a second unit or component regardless of whether the first and second units are directly coupled or indirectly coupled, such as via intermediate units, including switches that operatively couple the units for only a segment of time, as long as a signal path can be found that directly or indirectly establishes a relationship between the first and second units. For example, the client computer 105 is in communication with the VSM server 110 even though intermediate system (e.g., a router or switch) 125 and a packet network 130 having multiple switches etc. are disposed between the user device 105 and VSM server 110.

In the illustrated case client 201 includes a data transfer manager or exchange unit 206, which in simple form could be an appropriately programmed electronic processor 207 (e.g., a general purpose CPU (central processing unit) and memory or data store 211. A timer 205 is also preferably employed in the data exchange control process, as will be explained further in connection with the flow chart of FIG. 3 below. A typical client 201 would also include some form(s) of user interface such as display 204, a data encoder/decoder 203 to accommodate the system communications protocol(s), and a transceiver (if using rf or infrared communications) and a modulator-demodulator (or modem) 202 to connect to a wireless or wireline communications network. Transceiver/modem 202 in this case would either include a built-in or attached user module for wireless LAN communications; the specific type will vary depending on the system, e.g., including PCMCIA (personal computer memory card interface association) wireless modems, and attached or built-in PSTN (public switched telephone network) modem, etc. Specific features of data exchange unit 206 preferably includes (as more fully described below) a prestage filter (PSF) manager 208, rate governor (RG) 209, user profile store 212, select and summary index store 213, and mail store 214 (a store being any available device (e.g., ROM (read-only memory), disks) or program (e.g., a database) for storage of the specified information).

The communication server 220 preferably includes a data transfer manager or controller 229 having a VSM 230, memory stores for storing active client profile (user parameters) and inactive client profile information 226 and 227, a timer 224, and optionally some form of protocol translators or formatters 222. The VSM 230 serves to manage the virtual session with the client 201 and session with host systems 240, 255 and/or 260 based on the parameters loaded into the active user parameter store/profile memory 226 or object. Controller 229 preferably also includes a query manager (QM) 231 for controlling specific processes (e.g., sending messages to a post office to query for unprocessed messages and forwarding received messages etc.), and a prestage filter 232 and rate governor 234. Memory 225 also preferably includes a client select and summary index database or store 228, which will also be described more fully below in connection with FIGS. 7 and 8. The protocol translators 222 serve to format or code the messages as appropriate for transport between the VSM 230 and client 201; these include, e.g., appropriate protocol software that can be located at the communications server, or any other convenient processor per design of the given communication system. By messages is meant any appropriate data unit (whether a frame, datastream, packet, or other format), including objects, datagrams, etc., for containing information being communicated.

Communications server 220 is also illustrated as supporting additional users, e.g. user module 216, communicating via different access points, e.g., control module (CM) 217 of a wireless LAN and base station 219, all access points 217–219 being coupled via a common bus, backbone, etc. These base stations can be part of the same communication system, similar systems owned by different service providers, or even different systems, all of which may be different from the communications server service provider. Thus, for example, a single communications server can support at one local region 215 an ARDIS® node, a RAM® node, a wireless LAN controller module, a CDPD node, an in-building cordless telephone node, etc., allowing users from a variety of systems to access the same communications server and post office. Users not registered could access through the appropriate one of these nodes along the model of FIG. 1, i.e., via PDN 250 to a remote communications server having their VSM/QM. Thus, any number of system configurations is possible, limited only by the network services provided and the user's preference.

Figure 3:
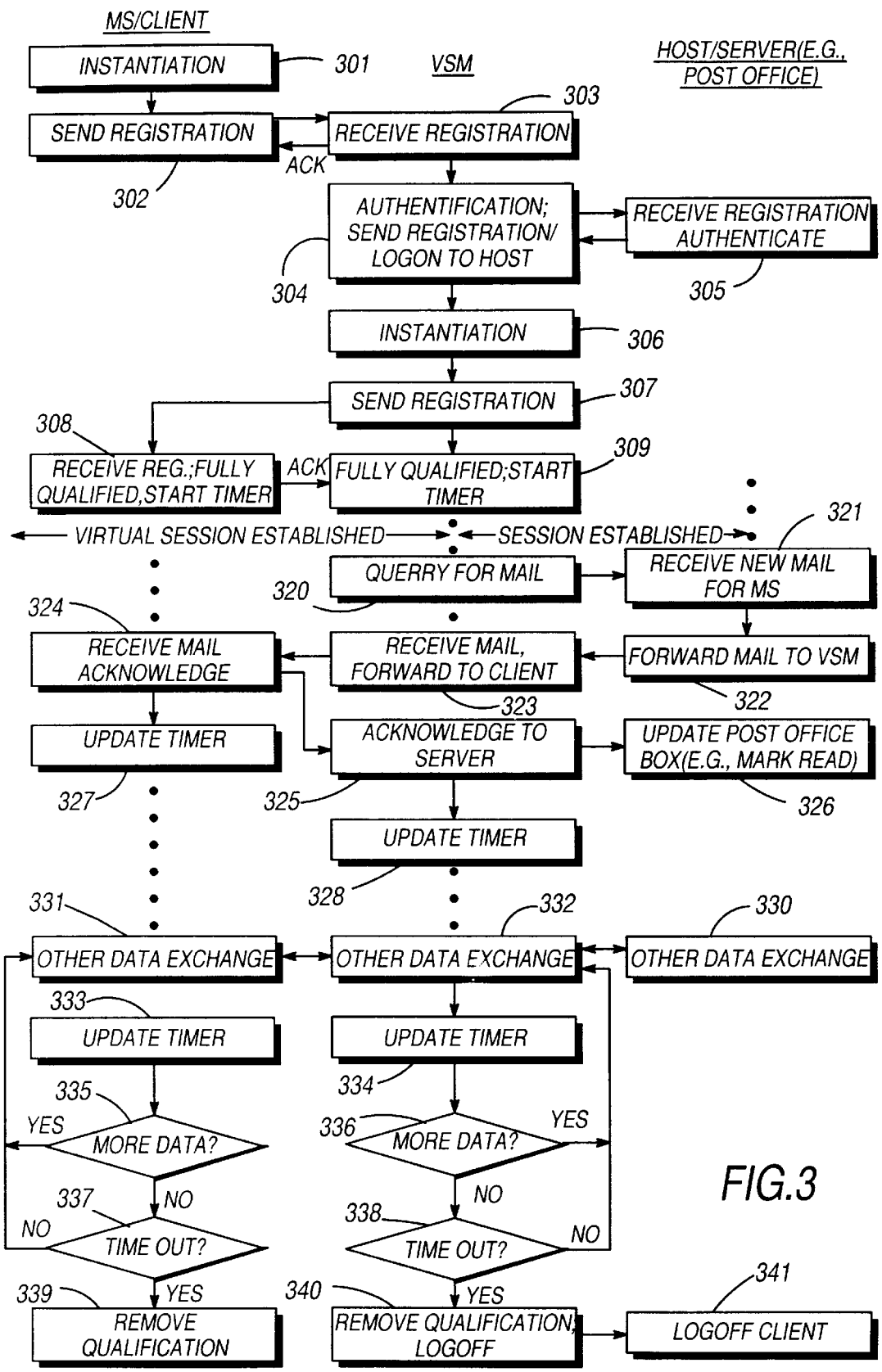
FIG. 3 is a flow chart illustrating virtual session data transfer between the different functional entities of the wireless communications system of FIG. 2.

A process by which a VSM manages communications between client and host is illustrated in the flow chart embodiment of FIG. 3. This process typically begins with a user event, such as instantiation (forming) of a communications object at the client and sending a registration message (steps 301–302). Alternatively, the infrastructure could initiate the communications by sending a page or the like requesting the client to register (for example, when the client has registered with the wireless system but not yet requested registration with the communications server). In any event, once a registration message is received by the communications server, it preferably authenticates and otherwise qualifies the client, including sending a logon/registration message to the host for its authentication of the client (steps 303–305). Upon successful authentication, the communications server instantiates a client object (CO) for the communications session including client parameters retrieved from an inactive client parameter store, as modified by the user in his registration or subsequent messages (step 306). These parameters include at a minimum client and host identifiers, but may also include additional preferences based on the type of communications involved. Also, the registration and authentication process can be handled by the VSM, or alternatively by another appropriately programmed entity of the communications server. Following instantiation at the server, a response message, e.g., a further registration message, is sent to the client, and an acknowledgment (ACK) returned to the server; both client and server then retain the instantiated objects as fully qualified, and start session timers (steps 307–309). At this point a virtual session has been established between the client and the VSM, and a regular session established between the VSM and host computer. If the registration is not successful, then any instantiated object is deleted, with the client returned to an inactive status.

Upon establishing the virtual session, a query is preferably generated by query manager requesting unprocessed data for the user, and the VSM forwards the query to the host (step 320). In the case of email, e.g., this might include generating a request message for all unread mail in the users post office box. The post office then checks for new mail received, and forwards all such mail to the VSM (steps 321–322). Because the VSM has established a LAN session with the post office, these communications are performed relatively quickly, e.g., in accordance with the LAN's and host's typical processing for their current loading level. The VSM in turn forwards the data (i.e., mail) received via the virtual session transport (step 323). For example, in the case of FIG. 1 where PDN 130 is an ISDN (integrated services digital network) network connected to a CDPD wireless network, the mail would be appropriately packetized by the communications server and delivered via the serving BS 120 according to ISDN/CDPD system protocols. This can take up to several minutes or more for a moderately sized mail package. However, since the data is being delivered in a sessionless mode, the amount of time the communication channel (including the more expensive wireless communication channel portion, as well as the portion via PDN 130) is tied up is kept to a minimum. This also translates into a significant cost savings for the user, since the user is only charged on a per packet basis for mail when it is actually transported, and doesn't have to pay for a prolonged session to keep connected to the post office in order to receive new mail. Finally, upon receipt by the client, appropriate acknowledgments are sent and the post office box updated, e.g., by marking the mail as read or processed (steps 324–326)

While in some systems it may be advantageous to store some of the data at the communications server, in the case of email and the like it is presently envisioned that the communication server is preferably used in maintaining the sessions between client and host, and not as a remote server for the host. Thus, rather than have all new data from the host pushed down to the communications server, most data exchanges are preferably initiated, at some predetermined interval or intervals, by the communications server (e.g., by the query manager).

Further, it is an inefficient use of resources to continue querying a host or attempting to deliver data when the client is no longer receiving at its remote location (occurring, e.g., when the client leaves a coverage area, or the user turns off its modem or processor). Thus, a process for either maintaining the client in an active status, or removing the client from active status in response to an event, is also preferably included in the VSM. One such process is to utilize timers at both client and VSM to determine when a virtual session is no longer active. The timers are first set upon registration, and are subsequently reset after each data exchange (steps 327–336). If no data exchange occurs within a predetermined period of time, say 20 minutes, both client and VSM would remove the client qualification (i.e., destroy the client object for the communication session) and, if desired, mark the client as being in an inactive status (steps 337–340). The VSM would also forward a logoff message to the host (step 341). In order to avoid an undesired time out, the client is preferably configured to send a short message after a predetermined period since the last data exchange, sufficiently prior to the time at which the timers elapse so that the VSM can receive it. Otherwise, if there are only intermittent data exchanges, the client may be required to frequently re-register; this in turn means the client will not be notified of outbound data until the client re-registers and is again coupled via the virtual session manager.

Figure 4:
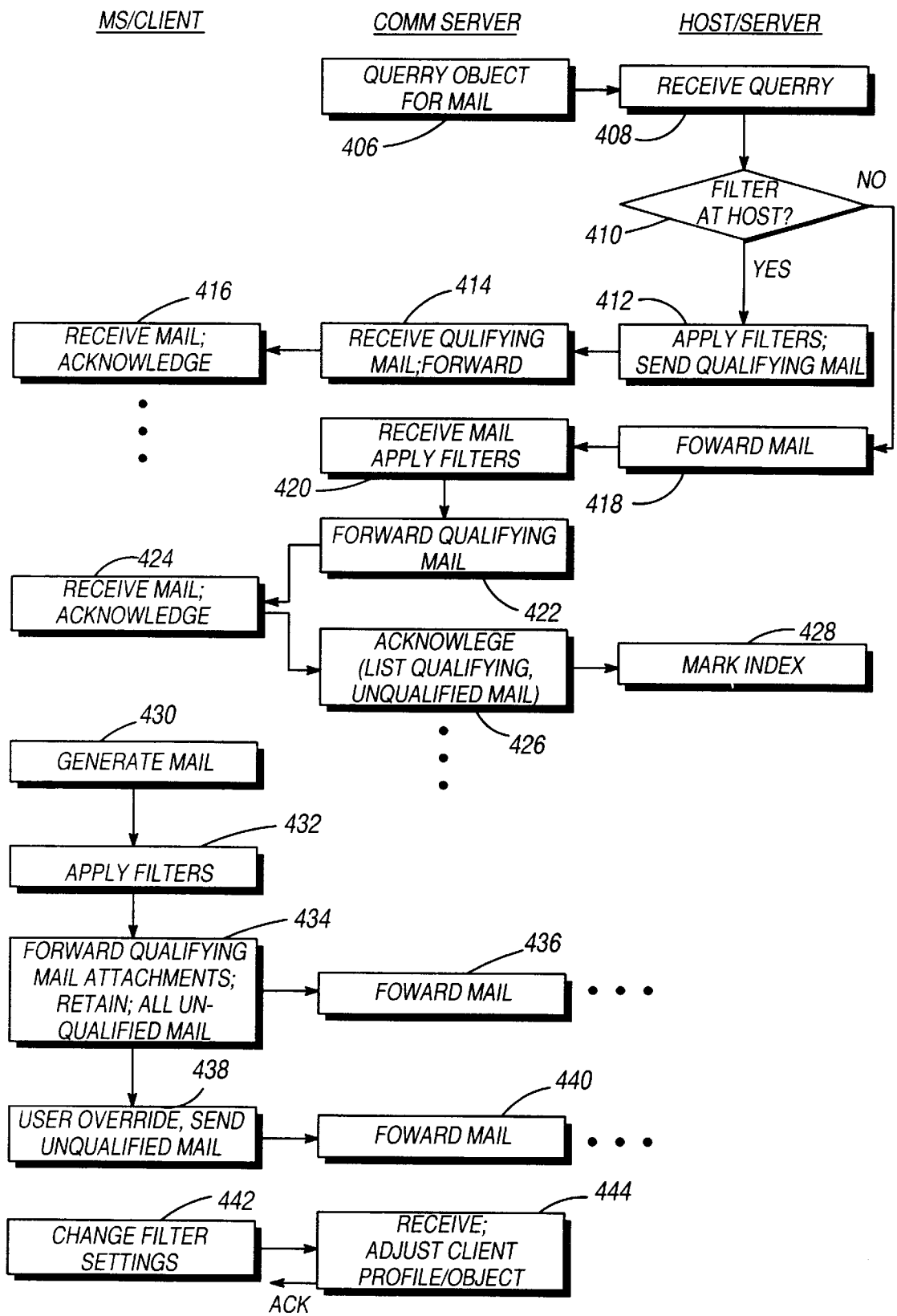
FIG. 4 is a flow chart illustrating a pre-stage filtering embodiment for data transfer between the different functional entities of the wireless communications system of FIG. 2.
Figures 5, 6:
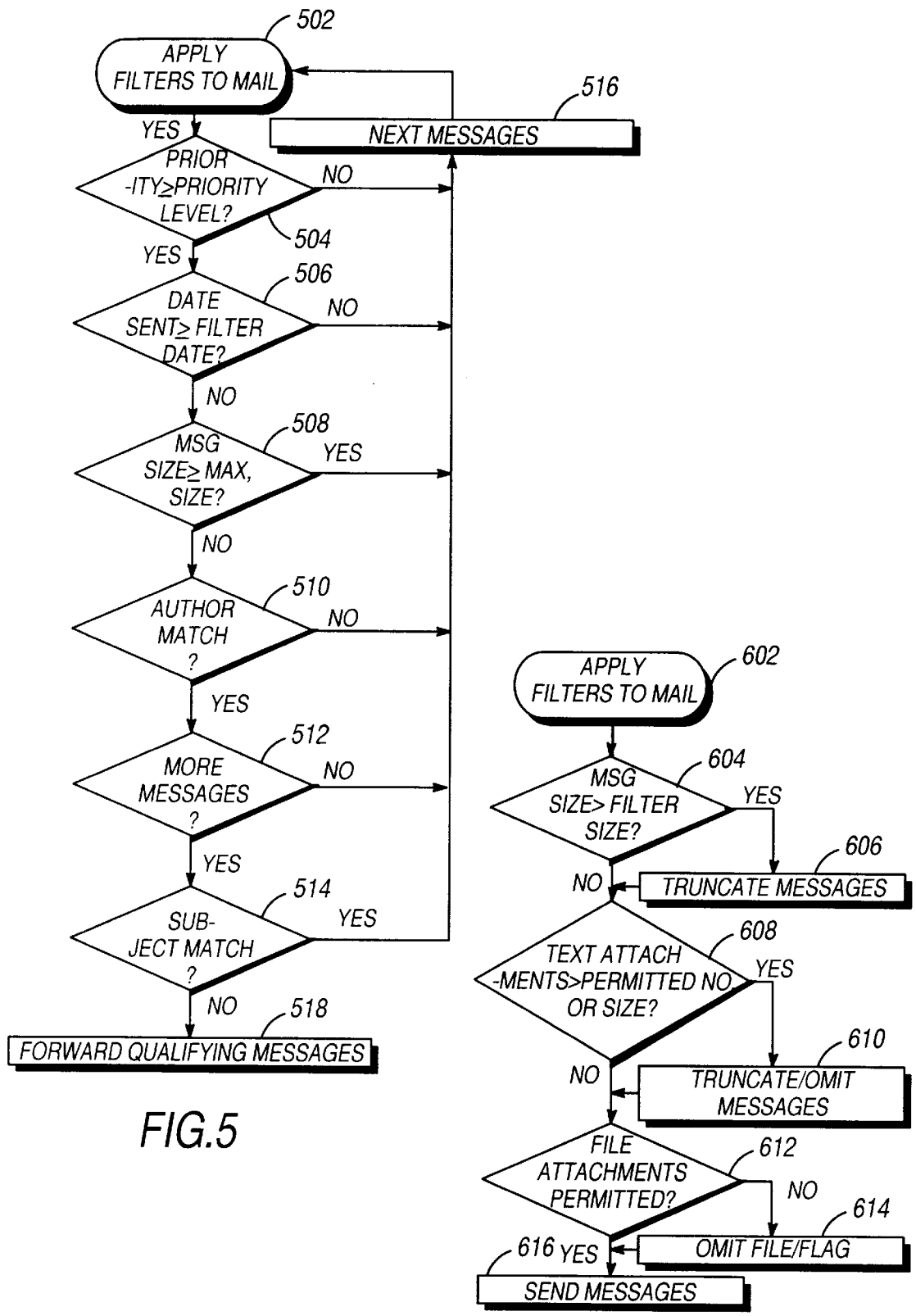
FIG. 5 is a flow chart illustrating one embodiment of pre-stage filtering for data transfers.
FIG. 6 is a flow chart illustrating another embodiment of pre-stage filtering for data transfers.

Turning now to FIGS. 4 through 6, a presently preferred embodiment is shown for prestage filtering data for transfer between the different functional entities of the wireless communications system of FIG. 2. This typically begins with the generation of a query object or message at the communications server (step 406). This object/message may be created in response to a preceding client generated message (e.g., a request generated when clicking on an application button requesting updates, executing the mail application, etc.), or in response to settings in the client profile. However, after updating the active client profile/object for an active client application, the query manager is preferably programmed to send query objects at predetermined intervals for each application being run by each active client, the intervals varying depending on the application type (e.g., longer for mail (about every 5?* seconds) than for interactive applications like Lotus Notes (about every 1?* second). Alternatively, the intervals could be user specified via the client profile, for example to shorten the query intervals for time critical applications (e.g., for emergency services or "real time" applications), or lengthen the intervals when less frequent updates are desired (e.g., to conserve on traffic expenses for updates to a rapidly changing, but non-time critical, group-ware file or document).

The content of the query objects will vary depending both upon the application and client filter settings. One approach for mail applications is to have a predetermined number of user-definable filter attributes stored in the client profile databases (e.g., stores 212 and 226–227 of FIG. 2). These attributes can include, by way of example, the priority of a message (e.g., urgent, normal, or low); the date on which the message is sent or posted; the size of the message (typically uncompressed, i.e., the normal stored size; although transmission size or cost could also be used); the author of the message; and the subject of the message (e.g., key words in a subject line or in the text). These attributes can simply be used as reject criteria (e.g., reject all messages having "low" priority, date before "12/15/95", size more than "2" kbytes (kilobytes), or subject not containing "project x"), pass criteria (all messages from "Boss") or a combination of both, the variety and complexity being a matter of design choice. These attributes also preferably include certain "granularity" filters, i.e., filters additionally limiting the size of a message passing all or most of the other filters. Three possible examples of granularity filters are a truncation size filter (e.g., truncate the message after the first "100" bytes), and text or file attachment filters (e.g., indicating whether or not to strip attachments). Thus, messages passing all criteria but message size could still be received in a truncated size meeting the message size criterion. Alternatively, messages failing the author or subject filters could still be passed with header information, by setting all rejected messages to be passed with a text truncation size of "0" bytes. One skilled in the art will appreciate that a variety of other reject/pass filter criteria may be used, and the specific ones and combinations of user-definable (or even administrator-definable) features will be largely a matter of design choice depending on factors such as the desired functionality, complexity, and application(s) (including filterable features). It is significant, however, that clients are now provided by the present invention with a means for effecting prestage filtering of their communications by virtue of the communications server and definable filter settings, rather than having to choose between receiving no messages or receive all messages, including less important or expensive and time-consuming transmissions.

The prestage filtering is preferably performed at the host server. This may be accomplished, for example, by passing the filter attributes in an appropriately formatted query object or message for use by the host application. In the illustrated case a query object with the client filter settings is forwarded to the post office, and applied by a communications server object or CSO (instantiated at the post office when the virtual session is established). The post office/CSO reads/queries the query object for the filter attributes, and applies these criteria in the selection and formatting of unprocessed messages (steps 408–412). The filtered messages are then encapsulated and forwarded to the QM, which similarly forwards the filtered messages (with appropriate protocol translation) to the client (steps 414–416). Alternatively, where the host application is not designed to permit prestage filtering, all unprocessed messages can be forwarded to the communications server, where the filters are applied via a prestage filter (PSF) object or routine (e.g., PSF 232 of FIG. 2), with only qualifying/filtered messages being forwarded to the client (steps 410, 418–424). Through acknowledgments the post office is notified how to mark the mail index in both cases. For example, when prestage filtering at the post office, all forwarded mail would be marked as processed/read and all filtered mail as unprocessed (truncated messages being marked as either depending on design conventions, or if available marked as filtered or partially processed). If prestage filtering is done at the communications server only those messages forwarded to the client would be acknowledged and marked as processed (step 428).

In addition to download/downlink filtering, prestage filtering is also advantageously used in upload/uplink transmissions. This can take the form of granularity filtering, or automatically retaining the whole data unit or message based upon filterable attributes for later transmission when on a lower cost network. In this case, each client would have a prestage filter (PSF) unit such as that of PSF 208 of FIG. 2 (e.g., a PSF object or routine drawing on selected attributes in the profile store 212). Each data unit generated is filtered using the user-selected criteria, with qualifying data being forwarded via the communication server (steps 430–436). If a data unit is not sent, it is retained locally for transmission later, e.g., when connected via a lower cost network to the post office. As an enhancement, the user could additionally be provided with a selection of types of send buttons (i.e., filtered send or unfiltered send), or be prompted with an alert dialogue or similar message when a message is filtered to decide whether to forward the data unfiltered (steps 438–440). Similarly, the user can be provided with several groups of filter settings that could be manually or automatically activated, so as to enable the client to adjust plural filter settings with a minimum effort, for example by switching to a more restrictive profile when entering important meetings (which profile could be automatically activated via an appropriately configured and coupled calendar program, etc.).

While only the client need retain the upload filter attributes in its profile store, preferably both the communication server and client store copies of the download filter settings in their profile memories. This conveniently permits a client to review all settings whenever desired, and to change the settings locally. When the download settings are changed at the client, the changes are communicated to the communication server preferably as soon as the change is made, or as soon as a virtual session is established if the changes are made while offline from the communication server (steps 442–444). Further, where a summary index of filtered messages is maintained (as is described in connection with FIGS. 7 and 8 below), upon a change in filter settings the communication server may be automatically set to forward all messages previously rejected but now passing the new filter settings.

FIGS. 5 and 6 illustrate two approaches to prestage filtering particularly useful for email filtering. In FIG. 5, a series of five reject filters are applied to each message. If a mail message does not meet any of the criteria (priority, date, size, author, or subject/key word) then it is left unprocessed (steps 502–516). Once all unreviewed messages (i.e., all unprocessed messages, or if expanded marking is available all unprocessed messages not previously filtered) have been filtered, those not rejected are forwarded (step 518). FIG. 6 illustrates the application of granularity filters. If a message exceeds the filter size, it is appropriately truncated (including insertion of a note indicating truncation) (steps 602–606). Similarly, if there are text or file attachments, and these are marked to be filtered, they are stripped with, optionally, a note being inserted alerting the addressee that the attachment was stripped (steps 608–614). Once filtered, the message is sent (step 616).

Figures 7, 8:
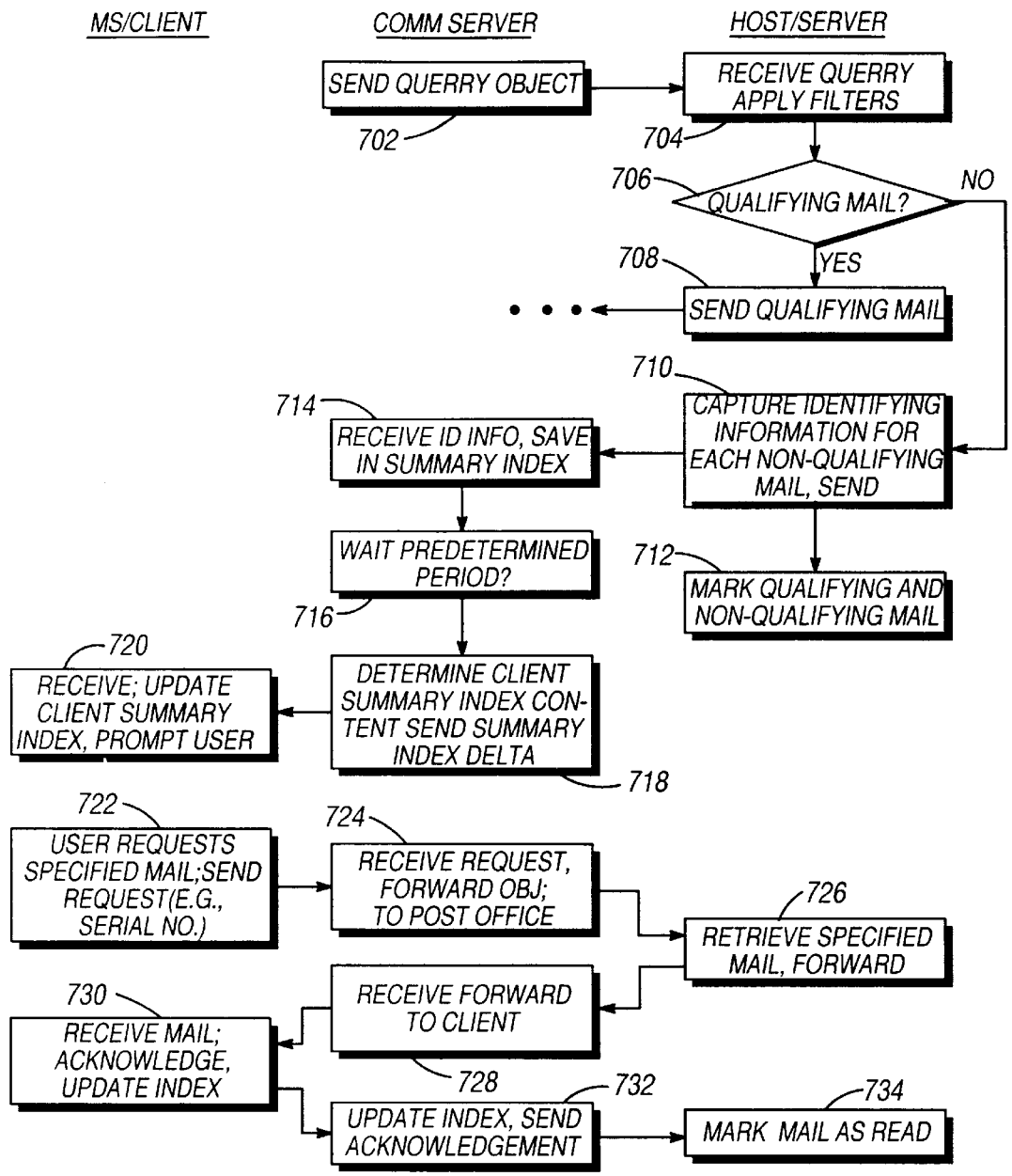
FIG. 7 is a flow chart illustrating a message summarization and selection embodiment for data transfer between the different functional entities of the wireless communications system of FIG. 2.
FIG. 8 is a diagram illustrating an embodiment of a summary index for use in the process of FIG. 7.

FIGS. 7 and 8 illustrate a further enhancement, permitting the user to more conveniently review selected information even for filtered/rejected data. In the preferred embodiment a query object or message is similarly generated by the communication server as described above. However, in addition to the profile information, the query object in this case includes a request for summary information about each partially and fully rejected message (step 702). When the host (i.e., a post office server in the illustrated case) receives the query it applies the appropriate filters; if only qualifying mail is present, this is forwarded to the client as described above (steps 704–708). Where there is partially (e.g., truncated) or fully rejected data, identifying summary information is captured for all rejected data (step 710). For mail this identifying summary information would include the message serial number, along with certain header information (801 and 802 of FIG. 8). This header information may include any filterable attribute (e.g., date, author, subject, size, priority, attachment indicator) and is preferably client definable, so the client can decide how much header information it needs and how much to omit. All qualifying and non-qualifying (i.e., filter-rejected) mail is marked similarly as described above (step 712).

When the response object or message is received by the QM of the communication server, the encapsulated identifying summary information is saved to a select and summary (S&S) index, such as that illustrated by client S&S index database 228 of FIG. 2 and the index structure of FIG. 8. This index is preferably created in response to the first query following full qualification, although one could retain a stored index when the client is inactive as long as the index is fully updated upon re-registration/qualification. In order to minimize transmissions between the communication server and the client, only changes to the S&S index are forwarded, as summary delta data (i.e., a delta of the revised index to the immediately preceding index, the preceding index being an acknowledged version same as that stored in the S&S index (e.g., S&S index database 213 of FIG. 2) of the client). Where only identifying summary information is received in response to the query object, one may additionally delay forwarding the delta information to the client for a predetermined period of time or until the next message passing the prestage filters is forwarded, whichever comes first (i.e., the filter-rejected information more likely being less important, some users may prefer to receive S&S index updates less frequently in order to further reduce costs or interruptions) (steps 714–718).

Upon receiving the delta of the identifying summary information, the client updates its S&S index and, when appropriate, prompts the user (again, the prompt criteria could be set for all messages, or some sub-set based on any filterable attribute, etc.). The user is thus able to review the summary information and make a determination on whether or not to override the filter rejection. For mail the user wants to read, the user indicates the decision by any appropriate means (clicking on the message, voice command, etc.) and an appropriate request generated (e.g., for all selected mail, for only a partially filtered version (e.g., truncated), etc.) (steps 720–722). The request is appropriately translated, as needed, and sent as a query object or message to the post office. Upon retrieval, the requested data is forwarded to the client via the QM. Upon receipt at the client, a read acknowledgment is generated and sent to the communication server. Preferably when the read acknowledgment is received at the communication server a further ACK (acknowledgment signal) is sent to the client, at which time both client and communication server update their respective S&S indices to remove the entry for read mail from the S&S index, and note any partially read mail. Upon acknowledgment, the post office further marks any read mail as processed (steps 724–734).

As with prestage filtering, one skilled in the art will appreciate that many more filterable attributes and summary inputs are possible than those described, and which ones are available will depend on such factors as the desired functionality, complexity, and application(s) (including filterable features) for which the select and summary index is being used. The index structure may thus similarly vary significantly, as will the means for achieving similar indices for both the client and communication server; in other words, while one could simply periodically forward the whole index, where practical any one of a number of known delta (e.g., data representing the content difference between two files) or other update approaches for communicating less than the whole index are likely more preferable. What is significant, no matter the particular design approach selected, is that a summary index, showing unprocessed or partially processed data (e.g., that filtered), is available to a client for determination on whether to process the data further, with a substantially identical index being retained at the communication server in order to further reduce transmission requirements.

Figure 9:
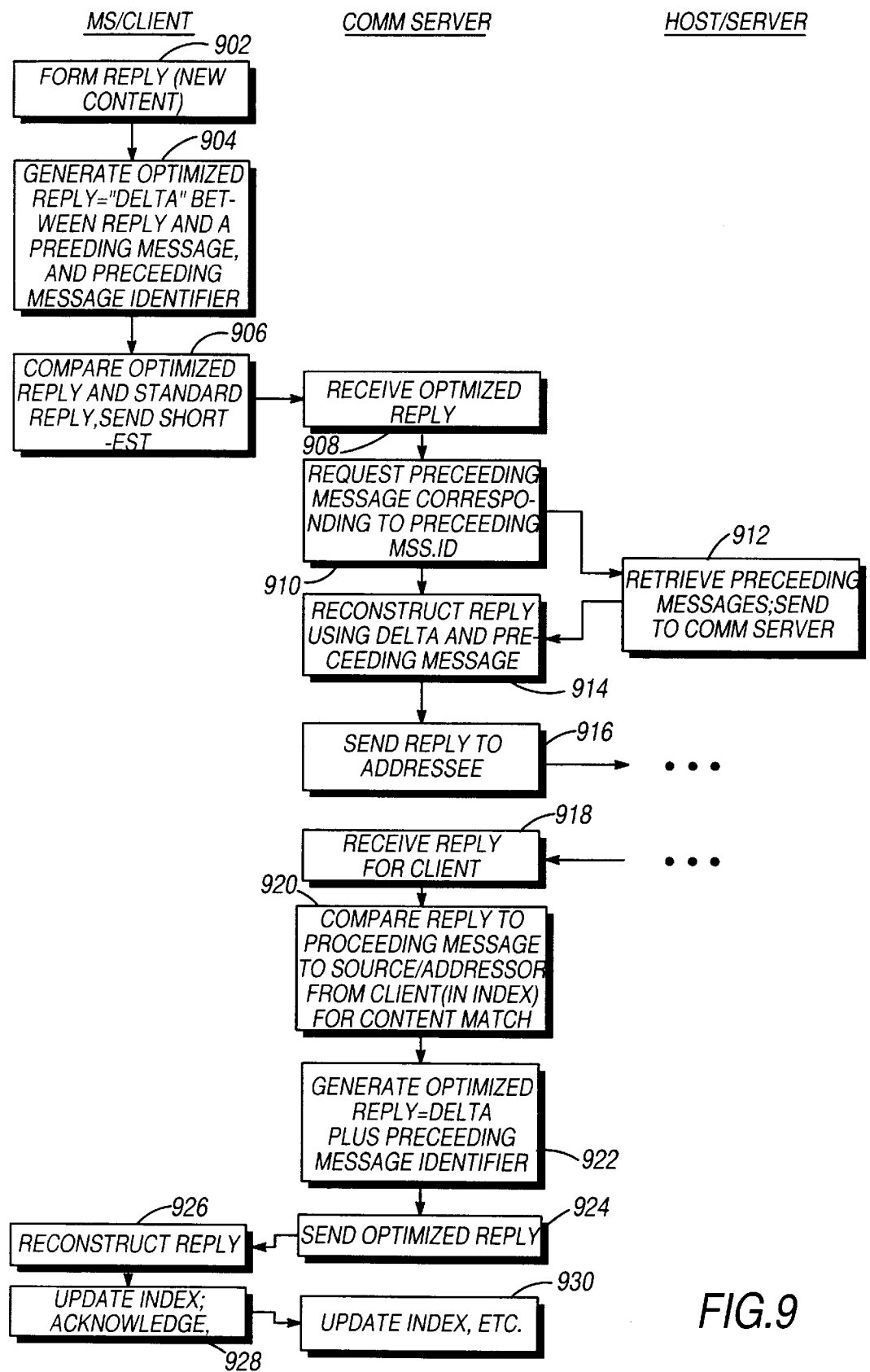
FIG. 9 is a flow chart illustrating an optimized reply embodiment for data transfer between the different functional entities of the wireless communications system of FIG. 2.

FIG. 9 illustrates a yet further improvement, this embodiment permitting a user to minimize the data transmitted for responses to earlier data transmissions. This is particularly advantageous in the case of email, where it is common to append all prior messages in an email conversation to a reply, making for lengthy reply messages that contain substantial portions that are identical to mail already saved at the client or target unit. While this has come to be expected in email replies, it is also quite costly in time and tariff charges in bandwidth limited systems like most wireless communication systems.

Starting from a client perspective, the process of FIG. 9 commences with a client formulating a reply to a received mail message, much as he or she would for any typical email application (step 902). However, when the user executes the reply, e.g., by clicking on a send button, the client controller (201 of FIG. 2) optimizes the reply message by calculating a delta or difference, using any appropriate delta routine, between the reply message and the preceding message. This delta is then formed into an optimized reply along with a message/data unit identifier for the preceding message/data unit (preferably the mail serial number, although any retrievable identifier of the preceding message may be used, such as header information, or even a CRC (cyclic redundancy check) value) (step 904). To ensure that only the shortest message is being sent, the controller additionally compares the reply message with the optimized reply to determine which is optimum for transmission (step 906). This determination may be made based on a comparison of the message sizes, compressed and formatted message sizes, or any other convenient means for estimating which version of the reply will require the least bandwidth or transport cost. Thus, for example, a normal reply message to a very short message may be selected for transmission where the overhead of the delta and message identifier make the optimized reply bigger than the normal reply message would be. However, in most instances it is anticipated that the optimized reply will be smaller than a normal reply message, providing significant savings to the client in time and costs.

When the optimized reply is received at the QM of the communication server, a determination is made on whether to reconstruct the normal reply message (i.e., form a replica reply) or to forward the optimized reply, based on known parameters (if any) of the target communication unit/client. Thus, for example, where both the originating and target clients are active and served by the same communication server and thus are known to have optimized reply capabilities, and the target client was an addressee or originator of the preceding message identified by the message identifier of the optimized reply, a reconstructed reply is not required. Rather, since the preceding message is either in the inbox or outbox of the target unit, the target unit can reconstruct the reply message from the identified mail in its mailbox and the delta. This advantageously allows bandwidth to be minimized for both the sending and target clients. Further, if perchance the target unit has already deleted the identified preceding message, the controller of the target unit could, rather than acknowledge receipt, send a request for the normal reply message, which the communication server would reconstruct as described next.

In cases where the target unit is not an active client with the communication server, the QM (or other appropriate entity of the controller) functions to reconstruct the reply message from the optimized reply. Because the communication server preferably does not retain a copy of client mail or data located on other hosts (such remote stores typically adding complexity and cost, while being unnecessary in view of the virtual session established via the communication server), it would use the identifier to retrieve the preceding message from the host (e.g., send a query object or message to the appropriate post office) (steps 908–912). This can be implemented by requesting the preceding message from the client inbox, or from the originating unit's outbox (or even the target unit's inbox, if it is a cc: on the preceding message). Because the serial number is a unique number widely used in email applications, this is the preferable message identifier for email systems. However, where this unique number is unavailable other identifiers may be used, including author, date and/or subject matches. Further, for some messages it may even be advantageous to use other relatively unique values, such as CRC or other values, by themselves or together with other identifiers. It is relatively unimportant for purposes of the invention what the identifier is, as long as it is useful within the accuracy demanded by the system design for retrieving the correct preceding message.

Once the preceding message has been received by the communication server, it uses a counterpart delta routine to that of the client to reconstruct a replica of the reply message from the delta of the optimized reply and the retrieved copy of the preceding message. Once reconstructed, the reply message is forwarded to the target unit(s), as well as to the outbox or sent mail folder of the client's post office box (steps 914–916). While some additional processing and network traffic is required between the communication server and host, this is relatively inexpensive compared to the savings achieved by using an optimized reply over the tariffed network between the communication server and client.

While the preceding approach can be implemented without resort to a message index, it can be further optimized by use of indices at the communication server and client. In this case, a full index of each active client's mailbox (or other application file(s)) is maintained at both the client and the communication server. This index could advantageously be one of the S&S indices 213 and 228 of FIG. 2 designed to include all mail (although perhaps with less identifying information for received mail than for filter-restricted mail, depending on factors such as the memory available and the amount of identifying information desirable). When an optimized reply is received at the communication server, a search of the appropriate client index (e.g., first the target unit, if also an active client, otherwise the client's or originating unit's indices) for the message identifier of the preceding message, indicating whether or not the preceding message has been deleted. When the preceding message's identifier is present, the process continues as noted above, in other words by sending the optimized reply to the target unit, or reconstructing the reply message and forwarding it to the target unit.

Replies being sent to the client can similarly use an optimized reply to minimize messaging sizes. Thus, for example, where a reply is received by the communication server which has the client as an addressee, the communication server is capable of generating a delta between the reply message and a preceding message known to be stored in a mail database (e.g., memory 214 of FIG. 2) of the client. The preceding message is most easily identified if an additional identifier is included with the reply for ease of searching in the client's index. However, where such is not included, identifier's can be extracted from the text (e.g., author, date, recipient, subject) for comparison matching. Alternatively, a comparison of the text of the reply message can be used in determining the preceding message. For example, a series of preceding messages could be retrieved for textual comparison; or alternatively an identifying value for all or selected (e.g., sent) mail can be maintained (e.g., by calculating the text CRC value and storing it in the index), and a check of selected portions (e.g., all portions below insertions identifying preceding messages in the text) of the reply message text can then be performed. The latest or largest matching preceding message is the selected (which could be either a message sent to, or sent from, the client), so as to minimize the delta, and the delta calculated between the preceding message and the reply message. An optimized reply is then formed including the delta and preceding message identifier recognizable by the client. This optimized reply is then forwarded, and reconstructed at the client into the reply message. In other words, the client retrieves from memory the message corresponding to the message identifier, and forms a replica of the reply message from the delta and message. Once acknowledged, both client and communication server indices are appropriately updated to reflect the mail transfer (steps 918–930).

This embodiment thus provides an efficient process for sending reply data between a client and the communication server, without requiring the costly transfer of earlier transmitted portions of the reply data.

Figure 10:
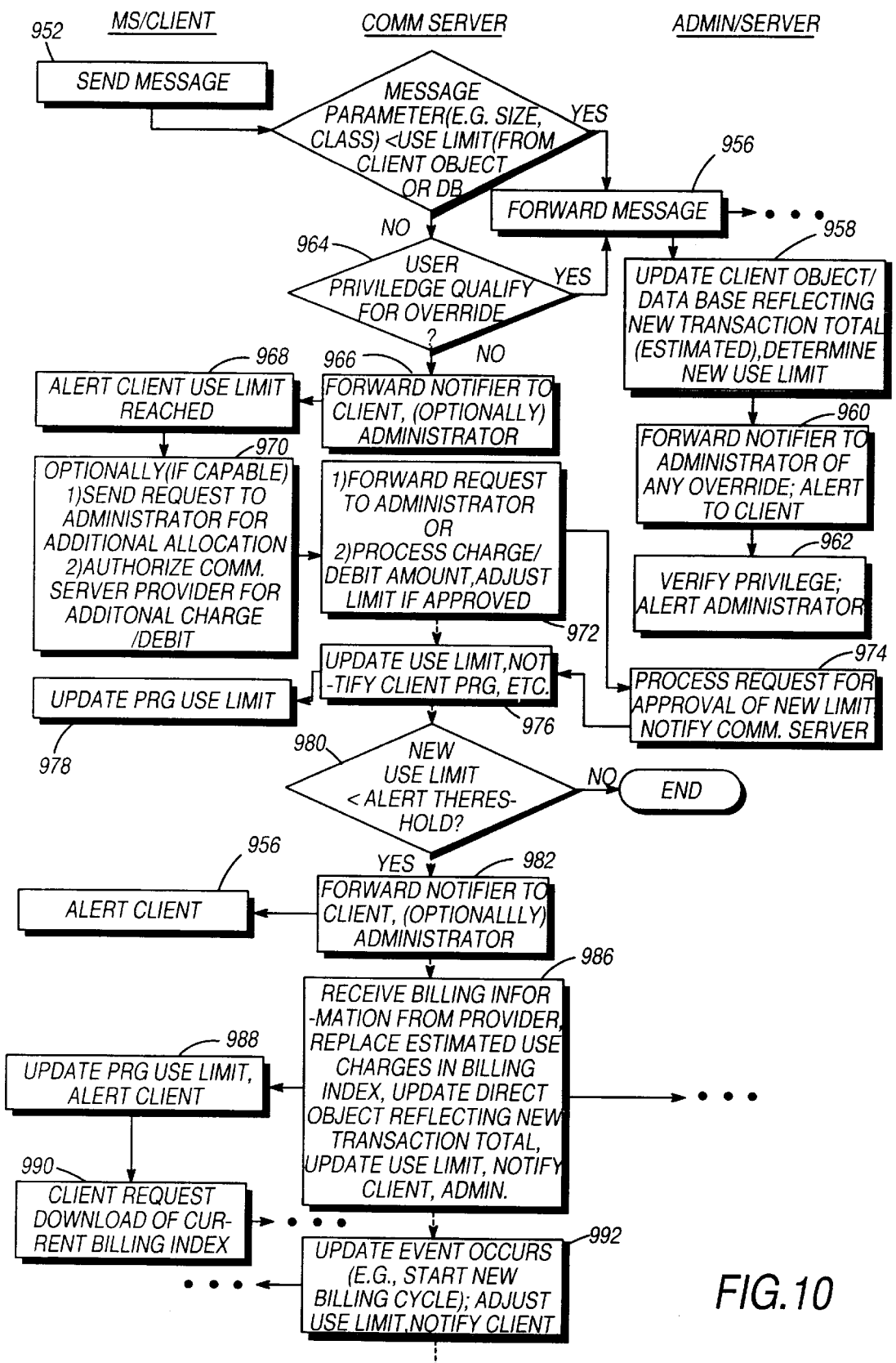
FIG. 10 is a flow chart illustrating a rate governor embodiment for data transfer between the different functional entities of the wireless communications system of FIG. 2.

In a final embodiment, a rate governor is provided so as to assist clients in maintaining their messaging and expenses within desired limits. Turning to FIG. 10, with reference also to FIG. 2, one embodiment of such a rate governor is illustrated. This rate governor operates to track the approximate time and/or expense for client use, which can be as simple as timing a circuit-switched connection, or where packet data is being sent, timing (or estimating based on size) the time and/or cost of transmitting the packet over the tariffed network(s). In estimating the transmission value (e.g., cost), a rate governor could better estimate actual costs by taking into account known pricing factors established by each network service provider (e.g., rates by time of day, by grade/quality of service (QoS) for packets, by size or bandwidth desired, etc.). These values would be maintained for application by the rate governor (234 of FIG. 2) as each data unit is received to determine an estimated transmission value.

In the illustrated case of an email application, upon receiving a client-generated message the QM (or other appropriate controller entity of the communication server) passes the pertinent packet information or message parameter (e.g., the packet size from the header) to the rate governor, which in this case operates as a packet rate governor (or PRG). The PRG determines from the client object (or profile store) the amount of use time and/or charge still available (or alternatively, the amount already used, and limits allowed), and compares the use time remaining (e.g., a previously authorized or allocated transmission value) against the value for the message parameter (step 954).

Preferably several limits are established, including one or more alert thresholds. These alert thresholds would serve to warn the client each time a certain threshold is passed in amounts of time/charge used or remaining, permitting the client to limit use as needed to stay within budget, or to seek a higher limit in advance of the point at which the use limit is reached. This use or transmission limit serves as the budgeted limit for data transfers. Unless a user is privileged, once the use limit is reached further communications/data transfers are restricted. In the simplest form, such transfers are restricted by alerting the client that the use limit has been reached, terminating the current session and preventing further sessions until additional use limit time/charge is authorized. Alternatively, certain messaging could still be permitted (based, e.g., on any filterable criteria—e.g., permitting messages to the administrator but not a further communication unit), but with reminders that routine messages will not be forwarded. This would advantageously allow critical messages, messages to an administrator (e.g., requesting additional authorization), etc., to still be transferred, although it does not prevent a user from running up excess charges for messaging to the communication server. A PRG may thus also be advantageously used in the client (e.g., PRG 209 of FIG. 2), signaled by the PRG of the communication server to automatically set certain prestage filters to restrict all but certain message transfers until a new use limit is provided. If a user were to bypass this client PRG and continue improper messaging, all further sessions could be terminated by the communication server with notification to the administrator and client.

If the user is privileged, data transfers would still continue despite the user limit having been exceeded. However, an alert would still preferably be sent to both the client and administrator, allowing the administrator to verify the privilege and reset the use limit if desirable, and the client to still be aware it has passed a targeted use amount (steps 956–968 and 980–984). In any event, after each data transfer the client object or store is updated to reflect the new estimated transaction total (e.g., time remaining, total expense, etc.) (step 958).

As mentioned above, if a user is not privileged it is preferable to allow the client an additional data transfer to an administrator requesting additional allocation of time/ charges. This request would be forwarded by the communication server to the administrator host, where it would be processed for approval. If approved, the administrator would notify the communication server to adjust the use limit by a specified amount. Alternatively, if there is no system administrator, but charges or debits are handled through a communication server service provider, the client may send any appropriate authorization for additional charge/debit to the communication server (e.g., by sending an encrypted account number and identifying information like a PIN (personal identification number). Once the charge or debit is processed and approved to the service provider's satisfaction, the amount of charge or debit would be used to adjust the use limit. A notification would also be forwarded to the client of the new use limit, with the client PRG being updated accordingly (steps 970–978).

In addition to updating the use limit in response to a user or administrator request, the rate governor can also be advantageously set to automatically update the use limits upon the occurrence of a predetermined update event. Thus, for example, where billing and budgeting is done on a monthly cycle, and the administrator has set rate governor preferences so as to automatically reset the use limit on the first day of the next billing cycle, the communication server will automatically reset the client use limit at the specified time and in the specified amount (step 992).

Moreover, in order to achieve an even more accurate billing control, the communication server could be coupled with the tariffed network service provider(s) so as to receive periodic charge statements for client data traffic, as well as updates for tariff rates, etc. In order to take advantage of these statements, a billing index would be maintained for each client estimating use and charges for each data transfer. Upon receiving the periodic charge statement (e.g., forwarded once a day during an administrative window) the estimated use entries are replaced by the actual use and charges from the statement, and the client profile (and object, if active) is updated to reflect a corrected use limit, etc. The administrator is notified, and the client is notified upon the next transaction, of the updated amount. If desired, the client or administrator can request a download of the current billing index showing the most recent estimated and actual charges (steps 986–990).

Finally, one should appreciate that the above process is equally applicable to groups as well as to individual clients. Thus, the PRG can advantageously be used to set use limits for groups and supergroups of users, as well as for individual clients as described above. Thus, where one of the applications being used is groupware, as opposed to the email example described above, different groups can be assigned group use limits for groupware data transfers (while retaining individual use limits for separate email or data transfers, etc.). To avoid one or two users exhausting the group's authorized limit, individual use limits can still be set for each client, although with more flexibility, e.g., to draw on unused group time before requiring additional allocation from an administrator, to permit another user of the group to yield a portion of its individual use limit, etc. As should be apparent, many variations exist on how the rate governor is structured, depending on the applications being used, clients and groups operating, the interactivity with service providers, complexity or simplicity desired, and many other related and unrelated factors.

One skilled in the art will appreciate that there are many variations that are possible for the present invention, only a limited number of which have been described in detail above. Thus, for example, while the embodiments above describe application to clients communicating in certain systems, one should appreciate that it has application to any communication system, wired or wireless, client-server, distributed or other networks, etc., in which the user is remote from a host. It can also be used with almost any application program or groups of programs (e.g., transferring database, wordprocessing, graphics, voice etc. files, executing programs and control messages, etc.), not just email or groupware. Moreover, while processor 206, controller 229, timers 205 and 224, data stores 211 and 225, and other circuits, are described in terms of specific logical/ functional/circuitry relationships, one skilled in the art will appreciate that such may be implemented in a variety of ways, preferably by appropriately configured and programmed processors, ASICs (application specific integrated circuits), and DSPs (digital signal processors), but also by hardware components, some combination thereof, or even a distributed architecture with individual elements physically separated but cooperating to achieve the same functionality. Thus, it should be understood that the invention is not limited by the foregoing description of preferred embodiments, but embraces all such alterations, modifications, and variations in accordance with the spirit and scope of the appended claims.

We claim:

1. A method of communicating data units over a wireless network between a client communication unit and a host device via a communication server, the method comprising, at the communication server:

filtering data units based on a first set of user-selected criteria to produce filtered data units;

communicating the filtered data units to the client communication unit;

receiving a second set of a plurality of user-selected criteria, wherein the second set of the plurality of user-selected criteria has been previously prepared at the client communication unit and, when completed, has been sent to the communication server in a virtual session;

filtering subsequent data units based on the second set of the plurality of user-selected criteria to create subsequent filtered data units; and communicating the subsequent filtered data units to the client communication unit.

2. The method according to claim 1 further comprising truncating a filtered data unit if the filtered data unit exceeds a first filter size.

3. The method according to claim 1 further comprising truncating a subsequent filtered data unit if the subsequent filtered data unit exceeds a second filter size.

4. The method according to claim 1 further comprising:

maintaining a summary index of data units that did not pass the first set of user-selected criteria to produce unfiltered data units; and automatically forwarding the unfiltered data units to the client communication unit that pass the second set of the plurality of user-selected criteria.

5. A method of communicating data units over a wireless network between a client communication unit and a host device via a communication server, the method comprising, at the client communication unit:

communicating a set of a plurality of user-selected criteria to the communication server;

storing the set of the plurality of user-selected criteria locally in a memory;

receiving filtered data units from the communication server based on the set of the plurality of user-selected criteria;

reviewing the set of the plurality of user-selected criteria locally;

modifying the set of the plurality of user-selected criteria locally to produce a modified set of a plurality user-selected criteria;

storing the modified set of the plurality of user-selected criteria locally in the memory;

communicating the modified set of the plurality of user-selected criteria to the communication server; and receiving filtered data units from the communication server based on the modified set of the plurality of user-selected criteria.

6. The method according to claim 5 wherein the steps of communicating occurs when a virtual session is established between the client communication unit and the communication server.

7. The method according to claim 5 wherein the step of modifying comprises modifying the set of user-selected criteria at the client communication unit while on-line with the communication server.

8. The method according to claim 5 wherein the step of modifying comprises modifying the set of the plurality of user-selected criteria at the client communication unit while off-line from the communication server.

9. The method according to claim 5 further comprising providing the client communication unit with several pre-defined groups of filter settings that are selectively communicable to the communication server.

10. The method according to claim 5 further comprising providing the client communication unit with several groups of filter settings that are manually activated.

11. A method of communicating data units over a wireless network between a client communication unit and a host device via a communication server, the method comprising:

filtering data units, at the communication server, based on a first set of a plurality of user-selected criteria to produce filtered data units;

communicating, at the communication server, the filtered data units to the client communication unit;

preparing, at the client communication unit, a second set of a plurality of user-selected criteria and, when completed, communicating the second set of the plurality of user-selected criteria to the communication server in a virtual session;

filtering subsequent data units, at the communication server, based on the second set of the plurality of user-selected criteria to create subsequent filtered data units; and communicating, at the communication server, the subsequent filtered data units to the client communication unit.

* * * * *

(12) EX PARTE REEXAMINATION CERTIFICATE (7892nd)
United States Patent
Eggleston et al.

(10) Number: US 6,101,531 C1
(45) Certificate Issued: Nov. 30, 2010

(54) SYSTEM FOR COMMUNICATING USER-SELECTED CRITERIA FILTER PREPARED AT WIRELESS CLIENT TO COMMUNICATION SERVER FOR FILTERING DATA TRANSFERRED FROM HOST TO SAID WIRELESS CLIENT

(75) Inventors: Gene Eggleston, Cary, IL (US); Mitch Hansen, Fox River Grove, IL (US)

(73) Assignee: Motorola, Inc., Schaumburg, IL (US)

Reexamination Request:
No. 90/010,891, Mar. 7, 2010

Reexamination Certificate for:
Patent No.: 6,101,531
Issued: Aug. 8, 2000
Appl. No.: 09/060,686
Filed: Apr. 15, 1998

Related U.S. Application Data

(63) Continuation of application No. 08/574,537, filed on Dec. 19, 1995, now abandoned.

(51) Int. Cl.
*H04L 29/06* (2006.01)
*H04L 12/28* (2006.01)
*H04Q 7/22* (2006.01)

(52) U.S. Cl. .................. 709/206; 709/207; 709/220; 709/232

(58) Field of Classification Search .................. None
See application file for complete search history.

(56) References Cited

U.S. PATENT DOCUMENTS

| 5,559,800 A | * | 9/1996 | Mousseau et al. | 370/401 |
| 5,742,905 A | * | 4/1998 | Pepe et al. | 455/461 |
| 5,802,465 A | * | 9/1998 | Hamalainen et al. | 455/403 |

OTHER PUBLICATIONS

Smith et al. Trials of Wirless, Secure Electronic Mail, IEEE Personal Communications, Aug. 1995, pp. 28–33.*
Smith et al., "Trials of Wireless, Secure Electronic Mail," IEEE Personal Communications (Aug. 1995), Pub. No. 1070–9916/95.

* cited by examiner

*Primary Examiner*—Deandra M Hughes

(57) ABSTRACT

In a main embodiment, prestage filtering is applied via user-definable filter parameters (e.g., reject, pass, or granularity filters) on data being transferred between a communication unit (201) and communication server (220). For downloading, e.g., email from a host post office (240), a communication server controller (229) preferably either forwards the filter parameters in a query object or message to the post office to apply and return qualified mail (406-414), or the communication server receives all unprocessed mail and applies the filters locally (418-420), only acknowledging as processed that mail which passes the filters. For uploading, e.g., email from a client, a client controller applies an upload prestage filter (432) so as to retain all filter-rejected email, while transmitting email passing the filters (434). Thus, only desired data transfers (i.e., those meeting user defined filters) are communicated over the expense-bearing networks between the remote unit and communication server.

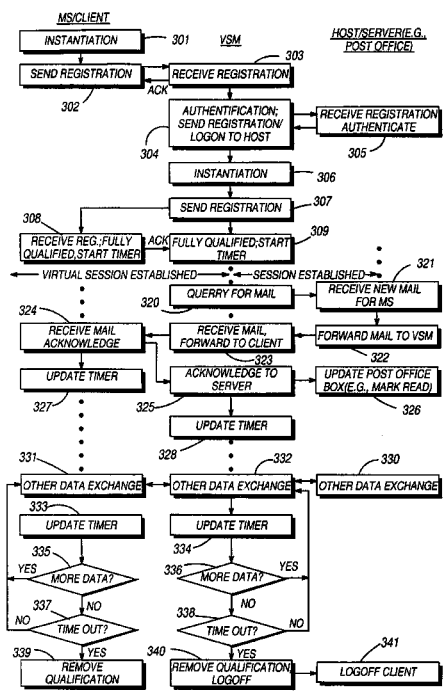

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3, 5-6, and 11 is confirmed.

Claims 4 and 7-10 were not reexamined.

* * * * *